(12) United States Patent
Baheti et al.

(10) Patent No.: US 11,670,110 B2
(45) Date of Patent: *Jun. 6, 2023

(54) USER AUTHENTICATION USING MM-WAVE SENSOR FOR AUTOMOTIVE RADAR SYSTEMS

(71) Applicant: Infineon Technologies AG, Neubiberg (DE)

(72) Inventors: Neha Baheti, Munich (DE); Ashutosh Baheti, Munich (DE); Avik Santra, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 39 days.

This patent is subject to a terminal disclaimer.

(21) Appl. No.: 17/357,451

(22) Filed: Jun. 24, 2021

(65) Prior Publication Data
US 2021/0319206 A1  Oct. 14, 2021

Related U.S. Application Data

(63) Continuation of application No. 16/254,020, filed on Jan. 22, 2019, now Pat. No. 11,087,115.

(51) Int. Cl.
*B60R 25/20* (2013.01)
*B60R 25/25* (2013.01)
(Continued)

(52) U.S. Cl.
CPC ...... *G06V 40/1365* (2022.01); *B60R 25/2045* (2013.01); *B60R 25/252* (2013.01);
(Continued)

(58) Field of Classification Search
CPC ... B62D 1/046; B60R 25/2045; B60R 25/252; B60R 25/25; G01S 7/35; G01S 7/415;
(Continued)

(56) References Cited

U.S. PATENT DOCUMENTS

| 4,241,347 A | 12/1980 | Albanese et al. |
| 5,719,950 A | 2/1998 | Osten et al. |

(Continued)

FOREIGN PATENT DOCUMENTS

| CN | 1463161 A | 12/2003 |
| CN | 1716695 A | 1/2006 |

(Continued)

OTHER PUBLICATIONS

"BT24MTR11 Using BGT24MTR11 in Low Power Applications 24 GHz Rader," Application Note AN341, Revision: Rev 1.0, Infineon Technologies AG, Munich, Germany, Dec. 2, 2013, 25 pages.
(Continued)

*Primary Examiner* — Abby Y Lin
*Assistant Examiner* — Hossam M Abd El Latif
(74) *Attorney, Agent, or Firm* — Slater Matsil, LLP

(57) ABSTRACT

In an embodiment, a method for authenticating a user of a car includes: transmitting a plurality of radiation pulses through a predetermined portion of a surface of the car towards a portion of a hand of the user using a millimeter-wave radar; receiving a reflected signal from the portion of the hand using the millimeter-wave radar; generating a fingerprint signature based on the reflected signal; comparing the fingerprint signature to a database of authorized fingerprint signatures; and authorizing the user based on whether the fingerprint signature matches an authorized fingerprint signature of the database of authorized fingerprint signatures.

24 Claims, 7 Drawing Sheets

(51) Int. Cl.

| | | |
|---|---|---|
| *B62D 1/04* | (2006.01) | |
| *G01S 13/26* | (2006.01) | |
| *G01S 13/34* | (2006.01) | |
| *G01S 13/42* | (2006.01) | |
| *G01S 13/87* | (2006.01) | |
| *G01S 13/88* | (2006.01) | |
| *G01S 13/89* | (2006.01) | |
| *G01S 13/931* | (2020.01) | |
| *G01S 7/35* | (2006.01) | |
| *G01S 7/41* | (2006.01) | |
| *G06V 40/12* | (2022.01) | |
| *G06V 40/20* | (2022.01) | |
| *G06V 40/70* | (2022.01) | |
| *G07C 9/00* | (2020.01) | |

(52) U.S. Cl.
CPC ............. *B62D 1/046* (2013.01); *G01S 7/35* (2013.01); *G01S 7/415* (2013.01); *G01S 13/88* (2013.01); *G06V 40/20* (2022.01)

(58) Field of Classification Search
CPC .......... G01S 13/88; G01S 7/417; G01S 13/26; G01S 13/343; G01S 7/412; G01S 13/42; G01S 13/87; G01S 13/89; G01S 2013/9316; G01S 2013/9322; G01S 2013/9327; G01S 2013/93271; G01S 2013/93274; G01S 13/931; G07C 9/00563; G06V 40/1365; G06V 40/20; G06V 40/70
USPC ........................................................ 701/49
See application file for complete search history.

(56) References Cited

U.S. PATENT DOCUMENTS

| | | | |
|---|---|---|---|
| 6,147,572 | A | 11/2000 | Kaminski et al. |
| 6,414,631 | B1 | 7/2002 | Fujimoto |
| 6,636,174 | B2 | 10/2003 | Arikan et al. |
| 7,048,973 | B2 | 5/2006 | Sakamoto et al. |
| 7,057,564 | B2 | 6/2006 | Tsai et al. |
| 7,171,052 | B2 | 1/2007 | Park |
| 7,317,417 | B2 | 1/2008 | Arikan et al. |
| 7,596,241 | B2 | 9/2009 | Rittscher et al. |
| 7,692,574 | B2 | 4/2010 | Nakagawa |
| 7,873,326 | B2 | 1/2011 | Sadr |
| 7,889,147 | B2 | 2/2011 | Tam et al. |
| 8,228,382 | B2 | 7/2012 | Pattikonda |
| 8,497,805 | B2 | 7/2013 | Rofougaran et al. |
| 8,659,369 | B2 | 2/2014 | Rofougaran et al. |
| 8,731,502 | B2 | 5/2014 | Salle et al. |
| 8,836,596 | B2 | 9/2014 | Richards et al. |
| 8,847,814 | B2 | 9/2014 | Himmelstoss et al. |
| 8,860,532 | B2 | 10/2014 | Gong et al. |
| 8,976,061 | B2 | 3/2015 | Chowdhury |
| 9,172,132 | B2 | 10/2015 | Kam et al. |
| 9,182,476 | B2 | 11/2015 | Wintermantel |
| 9,202,105 | B1 | 12/2015 | Wang et al. |
| 9,413,079 | B2 | 8/2016 | Kamgaing et al. |
| 9,495,600 | B2 | 11/2016 | Heu et al. |
| 9,886,095 | B2 | 2/2018 | Pothier |
| 9,935,065 | B1 | 4/2018 | Baheti et al. |
| 2002/0091484 | A1 | 7/2002 | Okajima et al. |
| 2003/0179127 | A1 | 9/2003 | Wienand |
| 2004/0238857 | A1 | 12/2004 | Beroz et al. |
| 2006/0001572 | A1 | 1/2006 | Gaucher et al. |
| 2006/0049995 | A1 | 3/2006 | Imaoka et al. |
| 2006/0067456 | A1 | 3/2006 | Ku et al. |
| 2007/0210959 | A1 | 9/2007 | Herd et al. |
| 2008/0106460 | A1 | 5/2008 | Kurtz et al. |
| 2008/0238759 | A1 | 10/2008 | Carocari et al. |
| 2008/0291115 | A1 | 11/2008 | Doan et al. |
| 2008/0308917 | A1 | 12/2008 | Pressel et al. |
| 2009/0073026 | A1 | 3/2009 | Nakagawa |
| 2009/0085815 | A1 | 4/2009 | Jakab et al. |
| 2009/0153428 | A1 | 6/2009 | Rofougaran et al. |
| 2009/0315761 | A1 | 12/2009 | Walter et al. |
| 2010/0207805 | A1 | 8/2010 | Haworth |
| 2011/0299433 | A1 | 12/2011 | Darabi et al. |
| 2012/0087230 | A1 | 4/2012 | Guo et al. |
| 2012/0092284 | A1 | 4/2012 | Rofougaran et al. |
| 2012/0116231 | A1 | 5/2012 | Liao et al. |
| 2012/0195161 | A1 | 8/2012 | Little et al. |
| 2012/0206339 | A1 | 8/2012 | Dahl |
| 2012/0265486 | A1 | 10/2012 | Kloter et al. |
| 2012/0268314 | A1 | 10/2012 | Kuwahara et al. |
| 2012/0280900 | A1 | 11/2012 | Wang et al. |
| 2013/0027240 | A1 | 1/2013 | Chowdhury |
| 2013/0106673 | A1 | 5/2013 | McCormack et al. |
| 2014/0028542 | A1 | 1/2014 | Lovitt et al. |
| 2014/0070994 | A1 | 3/2014 | Schmalenberg et al. |
| 2014/0145883 | A1 | 5/2014 | Baks et al. |
| 2014/0324888 | A1 | 10/2014 | Xie et al. |
| 2015/0033305 | A1 | 1/2015 | Shear et al. |
| 2015/0181840 | A1 | 7/2015 | Tupin, Jr. et al. |
| 2015/0185316 | A1 | 7/2015 | Rao et al. |
| 2015/0212198 | A1 | 7/2015 | Nishio et al. |
| 2015/0243575 | A1 | 8/2015 | Strothmann et al. |
| 2015/0277569 | A1 | 10/2015 | Sprenger et al. |
| 2015/0325925 | A1 | 11/2015 | Kamgaing et al. |
| 2015/0346820 | A1 | 12/2015 | Poupyrev et al. |
| 2015/0348821 | A1 | 12/2015 | Iwanaga et al. |
| 2015/0364816 | A1 | 12/2015 | Murugan et al. |
| 2016/0018511 | A1 | 1/2016 | Nayyar et al. |
| 2016/0041617 | A1 | 2/2016 | Poupyrev |
| 2016/0041618 | A1 | 2/2016 | Poupyrev |
| 2016/0061942 | A1 | 3/2016 | Rao et al. |
| 2016/0061947 | A1 | 3/2016 | Patole et al. |
| 2016/0090055 | A1 | 3/2016 | Breed |
| 2016/0098089 | A1 | 4/2016 | Poupyrev |
| 2016/0103213 | A1 | 4/2016 | Ikram et al. |
| 2016/0109566 | A1 | 4/2016 | Liu et al. |
| 2016/0118353 | A1 | 4/2016 | Ahrens et al. |
| 2016/0135655 | A1 | 5/2016 | Ahn et al. |
| 2016/0146931 | A1 | 5/2016 | Rao et al. |
| 2016/0146933 | A1 | 5/2016 | Rao et al. |
| 2016/0178730 | A1 | 6/2016 | Trotta et al. |
| 2016/0187462 | A1 | 6/2016 | Altus et al. |
| 2016/0191232 | A1 | 6/2016 | Subburaj et al. |
| 2016/0223651 | A1 | 8/2016 | Kamo et al. |
| 2016/0240907 | A1 | 8/2016 | Haroun |
| 2016/0249133 | A1 | 8/2016 | Sorensen |
| 2016/0252607 | A1 | 9/2016 | Saboo et al. |
| 2016/0259037 | A1 | 9/2016 | Molchanov et al. |
| 2016/0266233 | A1 | 9/2016 | Mansour |
| 2016/0269815 | A1 | 9/2016 | Liao et al. |
| 2016/0291130 | A1 | 10/2016 | Ginsburg et al. |
| 2016/0299215 | A1 | 10/2016 | Dandu et al. |
| 2016/0306034 | A1 | 10/2016 | Trotta et al. |
| 2016/0320852 | A1 | 11/2016 | Poupyrev |
| 2016/0320853 | A1 | 11/2016 | Lien et al. |
| 2016/0327633 | A1 | 11/2016 | Kumar Y.B. et al. |
| 2016/0334502 | A1 | 11/2016 | Ali et al. |
| 2016/0349845 | A1 | 12/2016 | Poupyrev et al. |
| 2017/0033062 | A1 | 2/2017 | Liu et al. |
| 2017/0045607 | A1 | 2/2017 | Bharadwaj et al. |
| 2017/0052618 | A1 | 2/2017 | Lee et al. |
| 2017/0054449 | A1 | 2/2017 | Mani et al. |
| 2017/0057436 | A1 | 3/2017 | Dow et al. |
| 2017/0060254 | A1 | 3/2017 | Molchanov et al. |
| 2017/0070952 | A1 | 3/2017 | Balakrishnan et al. |
| 2017/0074974 | A1 | 3/2017 | Rao et al. |
| 2017/0074980 | A1 | 3/2017 | Adib et al. |
| 2017/0090014 | A1 | 3/2017 | Subburaj et al. |
| 2017/0090015 | A1 | 3/2017 | Breen et al. |
| 2017/0115377 | A1 | 4/2017 | Giannini et al. |
| 2017/0131395 | A1 | 5/2017 | Reynolds et al. |
| 2017/0139036 | A1 | 5/2017 | Nayyar et al. |
| 2017/0141453 | A1 | 5/2017 | Waelde et al. |
| 2017/0170947 | A1 | 6/2017 | Yang |
| 2017/0176574 | A1 | 6/2017 | Eswaran et al. |
| 2017/0192847 | A1 | 7/2017 | Rao et al. |

(56) References Cited

U.S. PATENT DOCUMENTS

| | | | |
|---|---|---|---|
| 2017/0201019 A1 | 7/2017 | Trotta | |
| 2017/0212597 A1 | 7/2017 | Mishra | |
| 2017/0242095 A1* | 8/2017 | Schuh | G05D 1/0293 |
| 2017/0300053 A1* | 10/2017 | Wengreen | G06Q 20/145 |
| 2017/0300735 A1 | 10/2017 | Li | |
| 2017/0322295 A1 | 11/2017 | Loesch et al. | |
| 2017/0323130 A1 | 11/2017 | Dickinson et al. | |
| 2017/0351944 A1 | 12/2017 | Yang | |
| 2017/0364160 A1 | 12/2017 | Malysa et al. | |
| 2018/0041241 A1 | 2/2018 | Trotta et al. | |
| 2018/0046255 A1 | 2/2018 | Rothera et al. | |
| 2018/0071473 A1 | 3/2018 | Trotta et al. | |
| 2018/0101239 A1 | 4/2018 | Yin et al. | |
| 2018/0118161 A1* | 5/2018 | Ette | B60R 25/2054 |
| 2018/0322351 A1 | 11/2018 | Shaker | |
| 2019/0011532 A1 | 1/2019 | Loesch et al. | |
| 2019/0187265 A1 | 6/2019 | Barbello et al. | |
| 2019/0329733 A1 | 10/2019 | Ahmad | |
| 2020/0191938 A1* | 6/2020 | Green | B61L 25/023 |
| 2021/0165074 A1* | 6/2021 | Brosche | G01S 7/4026 |

FOREIGN PATENT DOCUMENTS

| | | |
|---|---|---|
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| CN | 203950036 U | 11/2014 |
| CN | 104786991 A | 7/2015 |
| CN | 105224139 A | 1/2016 |
| CN | 106355061 A | 1/2017 |
| CN | 207198571 U | 4/2018 |
| DE | 102008054570 A1 | 6/2010 |
| DE | 102011100907 A1 | 1/2012 |
| DE | 102011075725 A1 | 11/2012 |
| DE | 102014118063 A1 | 7/2015 |
| EP | 3141433 A2 | 3/2017 |
| GB | 2247799 A | 3/1992 |
| JP | 2001174539 A | 6/2001 |
| JP | 2004198312 A | 7/2004 |
| JP | 2006234513 A | 9/2006 |
| JP | 2008029025 A | 2/2008 |
| JP | 2008089614 A | 4/2008 |
| JP | 2009069124 A | 4/2009 |
| JP | 2011148425 A | 8/2011 |
| JP | 2011529181 A | 12/2011 |
| JP | 2012112861 A | 6/2012 |
| JP | 2013521508 A | 6/2013 |
| JP | 2014055957 A | 3/2014 |
| KR | 20090063166 A | 6/2009 |
| KR | 20140082815 A | 7/2014 |
| WO | 2007060069 A1 | 5/2007 |
| WO | 2013009473 A2 | 1/2013 |
| WO | 2016033361 A1 | 3/2016 |
| WO | 2016173932 A2 | 11/2016 |
| WO | 2018206934 A1 | 11/2018 |

OTHER PUBLICATIONS

Chen, Xiaolong et al., "Detection and Extraction of Marine Target with Micromotion via Short-Time Fractional Fourier Transform in Sparse Domain," IEEE International Conference on Signal Processing, Communications and Computing, CSPCC, Aug. 5-8, 2016, 5 pages.

Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.

Deacon, Peter et al., "Frequency Modulated Continuous Wave (FMCW) Radar," Design Team 6 Technical Lecture, Nov. 9, 2011, 27 pages.

Dham, Vivek "Programming Chirp Parameters in TI Radar Devices," Application Report SWRA553, Texas Instruments, May 2017, 15 pages.

Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.

Dooring Alert Systems, "Riders Matter," http:\⅛ dooringalertsystems.com, printed Oct. 4, 2017, 16 pages.

Filippelli, Mario et al., "Respiratory dynamics during laughter," J Appl Physiol, (90), 1441-1446, Apr. 2001, http://iap.physiology.org/content/jap/90/4/1441.full.pdf., 6 pages.

Fox, Ben, "The Simple Technique That Could Save Cyclists' Lives," https://www.outsideonline.com/2115116/simple-technique-could-save-cyclists-lives, Sep. 19, 2016, 6 pages.

Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.

Inac, Ozgur et al., "A Phased Array RFIC with Built-In Self-Test Capabilities," IEEE Transactions on Microwave Theory and Techniques, vol. 60, No. 1, Jan. 2012, 10 pages.

Killedar, Abdulraheem "XWR1xxx Power Management Optimizations—Low Cost LC Filter Solution," Application Report SWRA577, Texas Instruments, Oct. 2017, 19 pages.

Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.

Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.

Lim, Soo-Chul et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.

Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/40064-015-1583-5; Jan. 2016, 16 pages.

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Diederichs, K. et al., "Wireless Biometric Individual Identification Utilizing Millimeter Waves", Microwave/Millimeter Wave Sensors, Sensors Council, vol. 1, No. 1, Feb. 2017, 4 pages.

Richards, Mark A., "Fundamentals of Radar Signal Processing," McGraw Hill Electronic Engineering, ISBN 0-07-144474-2, Jun. 2005, 93 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823, 8 pages.

Simon, W., et al., "Highly Integrated KA-Band Tx Frontend Module Including 8×8 Antenna Array," IMST GmbH, Germany, Asia Pacific Microwave Conference, Dec. 7-10, 2009, 63 pages.

Suleymanov, Suleyman, "Design and Implementation of an FMCW Radar Signal Processing Module for Automotive Applications," Master Thesis, University of Twente, Aug. 31, 2016, 61 pages.

Fhayananthan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.

(56) References Cited

OTHER PUBLICATIONS

Fhayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34, 17 pages.

Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, 11 pages.

\* cited by examiner

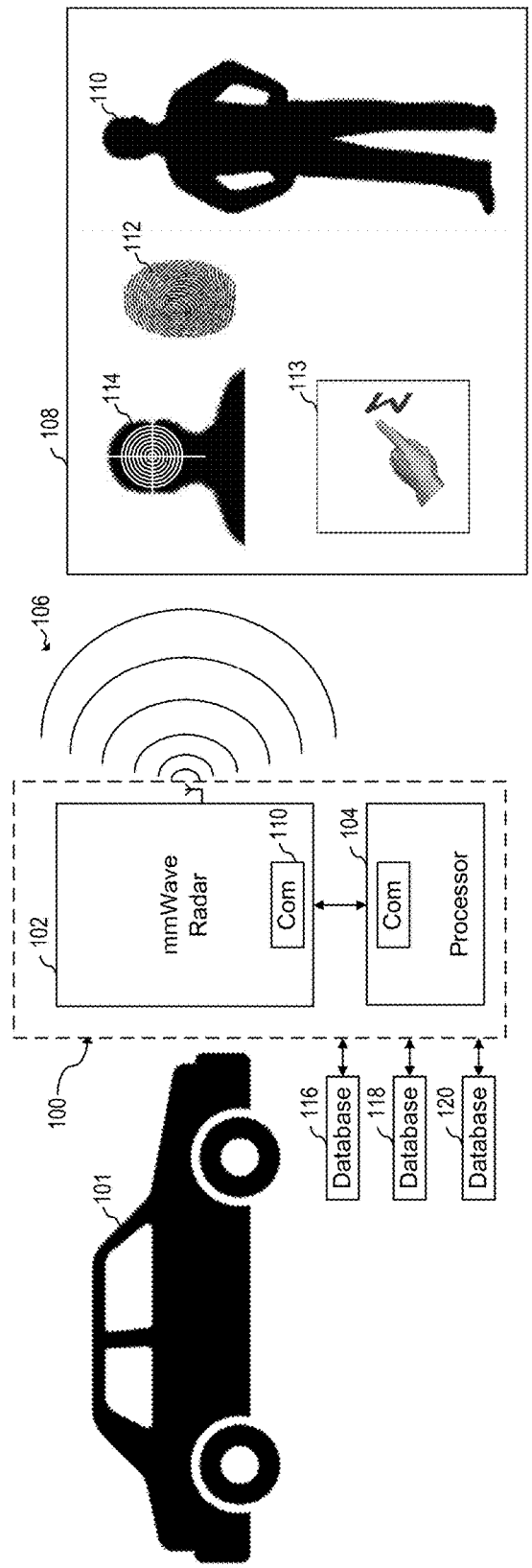
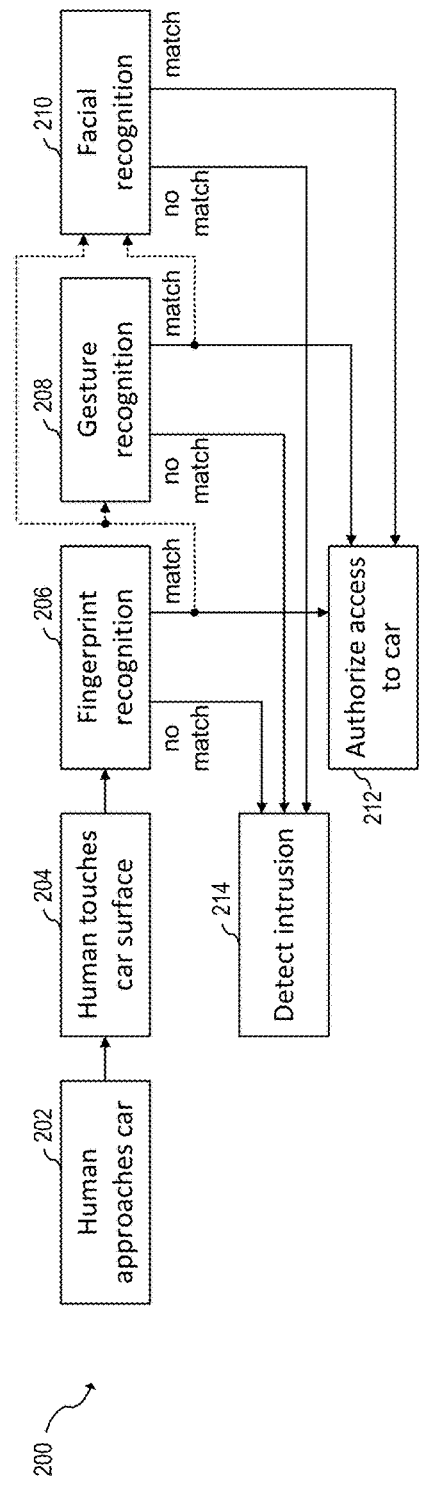
FIG. 1
FIG. 2

US 11,670,110 B2

USER AUTHENTICATION USING MM-WAVE SENSOR FOR AUTOMOTIVE RADAR SYSTEMS

CROSS-REFERENCE TO RELATED APPLICATIONS

This application is a continuation of U.S. patent application Ser. No. 16/254,020, entitled "User Authentication Using mm-Wave Sensor for Automotive Radar Systems," and filed on Jan. 22, 2019, which application is hereby incorporated herein by reference.

TECHNICAL FIELD

The present invention relates generally to an electronic system and method, and, in particular embodiments, to a user authentication using millimeter-wave (mm-Wave) sensor for automotive radar systems.

BACKGROUND

Cars are ubiquitous in today's society. For various reasons, including to prevent theft or unauthorized use, authentications mechanisms have been developed to control who can enter and/or operate a particular car.

In conventional cars, a lock is placed in the door handle to prevent unauthorized entry to the car, where a corresponding key (i.e., a metallic key) is used to open or close the lock. An additional lock is placed near the steering wheel to prevent unauthorized operation of the car, where a corresponding key is used to allow the car to turn on. In many cars, the same key is used to open the car and to operate the car.

With the advance of technology, wireless authentication mechanisms to control entry of the car are now common. For example, a remote control may be used to open the car. Some cars rely on a proximity sensor that is triggered when a transponder car key is within a certain distance of the car. Typically, authentication for remote controls and transponder car keys rely on encrypted communication In some cars, the remote control or transponder key may be used to enable the car to start the engine when the remote control is near the car (known as keyless ignition).

User authentication mechanisms for cars that rely on a physical key may be susceptible to unauthorized entry or operation if such physical key is lost or stolen.

SUMMARY

In accordance with an embodiment, a method for authenticating a user of a car includes: transmitting a plurality of radiation pulses through a predetermined portion of a surface of the car towards a portion of a hand of the user using a millimeter-wave radar; receiving a reflected signal from the portion of the hand using the millimeter-wave radar; generating a fingerprint signature based on the reflected signal; comparing the fingerprint signature to a database of authorized fingerprint signatures; and authorizing the user based on whether the fingerprint signature matches an authorized fingerprint signature of the database of authorized fingerprint signatures.

In accordance with an embodiment, a millimeter-wave radar includes: two transmitting antennas configured to transmit a plurality of radiation pulses through a predetermined portion of a surface of a car; two receiving antennas configured to receive a reflected signal corresponding to the transmitted plurality of radiation pulses; and a processor. The processor is configured to: generate a fingerprint signature based on the reflected signal, compare the generated fingerprint signature to a database of authorized fingerprint signatures, and authorize access to the car based on whether the fingerprint signature matches an authorized fingerprint signature of the database of authorized fingerprint signatures.

In accordance with an embodiment, a millimeter-wave radar system includes a first millimeter-wave radar, a second millimeter-wave radar, a first processor, and a second processor. The first millimeter-wave radar includes: a first transmitting antenna configured to generate a plurality of radiation pulses through a portion of a handle of a car, a first receiving antenna configured to receive a first reflected signal corresponding to the plurality of radiation pulses transmitted by the first transmitted antenna. The first processor is configured to: generate a fingerprint signature based on the first reflected signal, compare the generated fingerprint signature to a database of authorized fingerprint signatures, and authorize access to the car based on whether the fingerprint signature matches an authorized fingerprint signature of the database of authorized fingerprint signatures. The second millimeter-wave radar includes: two transmitting antennas configured to generate a plurality of radiation pulses through a predetermined portion of a steering wheel of the car, two receiving antennas configured to receive a second reflected signal corresponding to the plurality of radiation pulses transmitted by the two transmitting antennas. The second processor is configured to: generate a gesture signature based on the second reflected signal, compare the generated gesture signature to a predetermined authorized gesture signature, and start an engine of the car based on whether the gesture signature matches the predetermined authorized gesture signature.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 shows a car having a millimeter-wave radar system, according to an embodiment of the present invention;

FIG. 2 illustrate a flow chart of an embodiment method for authenticating a user, according to an embodiment of the present invention;

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 3A:
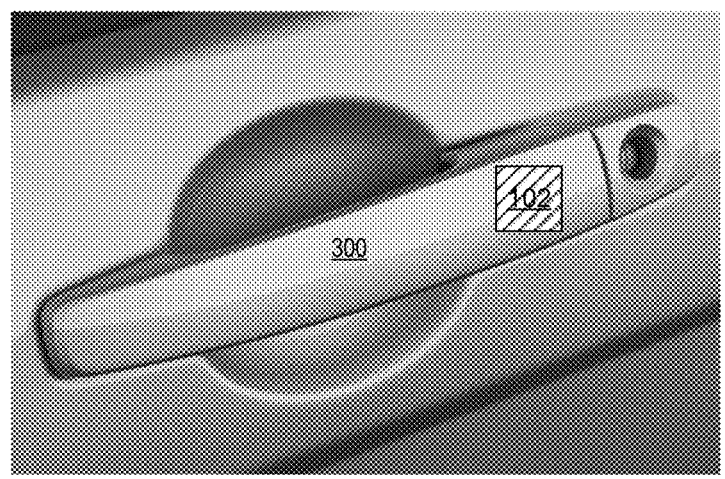
FIG. 3A shows a handle of the car of FIG. 1, according to an embodiment of the present invention.

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

The present invention will be described with respect to embodiments in a specific context, a user authentication mechanism using a millimeter-wave radar system to control access to a car. Embodiments of the present invention may also be used to control access to boats, airplanes, or other transportation means. Embodiments may also be adapted to control access to a house, office, or other premises or structures.

In an embodiment of the present invention, a millimeter-wave radar system is used to determine whether a human requesting access to a car is authorized to access the car. The millimeter-wave radar system captures a fingerprint of the human after the human touches, e.g., a handle of the car. The millimeter-wave radar then compares the captured fingerprint to a database of authorized fingerprint to determine whether the captured fingerprint matches an authorized fingerprint. As a second mode of authentication, when the millimeter-wave radar system determines that the fingerprint of the human matches an authorized fingerprint, the millimeter-wave radar system monitors a gesture of a finger of the human and compares the gesture to a predetermined gesture. When the gesture of the finger matches the predetermined gesture (where the predetermined gesture may be associated with the fingerprint of the human), access to the car is granted.

Using a millimeter-wave radar to control access to the car advantageously allows access to the car to authorized user while preventing access to the car to unauthorized users without relying on physical keys, such as metallic keys or remote keys. By avoiding the use of a physical key to authorize access to the car, unauthorized access to the car associated with the theft of the physical key, for example, is eliminated. By using an additional second mode of authentication, unauthorized access associated with, e.g., replication of an authorized fingerprint, is reduced. In some embodiments, the two modes of authentication are performed using a single millimeter-wave radar.

FIG. 1 shows car 101 having millimeter-wave radar system 100, according to an embodiment of the present invention. Millimeter wave radar system 100 includes millimeter-wave radar 102, and processor 104. FIG. 2 illustrate a flow chart of embodiment method 200 for authenticating a user, according to an embodiment of the present invention. FIG. 1 may be understood in view of FIG. 2.

During step 202, human no approaches car 101. In some embodiments, the proximity of human 110 is detected during step 202 using a proximity sensor as known in the art (e.g., using a proximity key). In other embodiments, the proximity of human no is detected using millimeter-wave radar 102 by detecting a moving object approaching car 101 (using, e.g., range FFT and tracking object movements, e.g., in slow time). In yet other embodiments, the proximity of human no is detected by detecting a touch in a surface of car 101, such as a surface of a handle of car 101 (e.g., during step 204). In yet other embodiments, millimeter-wave radar 102 constantly operate without monitoring proximity of a human.

During step 204, human no touches a surface of car 101, where millimeter-wave radar 102 has a field-of-view that includes such surface. In some embodiments, such surface includes a portion of a surface of a handle of car 101. In other embodiments, such surface includes a portion of a door, window, or roof of car 101. For example, in some embodiments, car 101 may include a scanning plaque (e.g., a plastic scanning plaque), where millimeter-wave radar 102 scans the fingerprint when a finger is in contact with the scanning plaque. Other surfaces of car 101 may also be used.

During step 206, while human no is touching, e.g., the handle of car 101, millimeter-wave radar 102 transmits a plurality of radiation pulses 106, such as chirps (e.g., linear chirps), through the handle of car 101 and towards a finger in contact with the handle to capture fingerprint 112. The transmitted radiation pulses are reflected by the finger of human no. The reflected radiation pulses (not shown in FIG. 1), which are also referred to as the echo signal, are detected by millimeter-wave radar 102 and processed by processor 104 to generate a fingerprint signature (i.e., a digital representation). The fingerprint signature is configured to identify a person, advantageously uniquely. Millimeter-wave radar system 100 (e.g., using processor 104) then compares the fingerprint signature to authorized fingerprint signatures stored in database 116 to determine whether the fingerprint signature matches any of the authorized signatures stored in database 116.

When millimeter-wave radar system 100 (e.g., using processor 104) determines that the fingerprint signature matches an authorized fingerprint signature of database 116, millimeter-wave radar system 100 (e.g., using processor 104) authenticates human no and authorizes access to car

101 (e.g., by unlocking the doors of car 101) during step 212. If the fingerprint signature does not match any authorized fingerprint signatures in database 116, millimeter-wave radar system 100 then detects an intrusion attempt during step 214 and takes appropriate action (e.g., reporting intrusion to owner of record via a smartphone app, sounding an alarm, or other action). In some embodiments, a predetermined number of attempts (e.g., 3 attempts) are allowed during step 206 before detecting an intrusion during step 214.

In some embodiments, more than one authorized fingerprint signatures are associated with an authorized user (e.g., for different fingers of the same human).

In some embodiments, the fingerprint signature is representative of a fingerprint such as fingerprint 112. For instance, it includes details associated with the topology of the finger surface, including the ridges and valleys commonly associated with a fingerprint. In some embodiments, characteristics of additional or biological structures other than such details, e.g., up to a depth of 5 mm, are captured and included in a fingerprint signature. In some embodiments, instead of or in addition to being representative of common fingerprint characteristics, the fingerprint signature is representative of the way the body part that generated the signature is placed in space and/or on a surface.

In some embodiments, the fingerprint recognition may be performed in accordance with the IEEE article: Diederichs, Kailtyn, Amy Qiu, and George Shaker, "Wireless Biometric Individual Identification Utilizing Millimeter Waves." IEEE Sensors Letters vol. 1, no. 1 (2017), pp. 1-4, which is incorporated herein by reference.

In some embodiments, the fingerprint includes the scanning of the topology of the skin and other biological structures located in other portions of the hand (e.g., the palm of the hand) instead of or in addition to the finger. Other elements of the human body may be used to generate a fingerprint.

In some embodiments, a second mode of authentication is used after a fingerprint match is found and before granting access to car 101 (e.g., steps 208 and/or step 210). For example, during step 208, millimeter-wave radar 102 monitors a predetermined area for gestures, such as finger gesture 113. For example, in some embodiments, millimeter-wave radar 102 transmits a plurality of radiation pulses 106 through the handle of car 101 and towards a finger to capture finger gesture 113. The transmitted radiation pulses are reflected by the finger of human no. The reflected radiation pulses (not shown in FIG. 1) are detected by millimeter-wave radar 102 and processed by processor 104 to generate a gesture signature (i.e., a digital representation) corresponding to finger gesture 113. Millimeter-wave radar system 100 (e.g., using processor 104) then compares the gesture signature to an authorized gesture signature, such as an authorized gesture signature stored in database 118, to determine whether the gesture signature matches any of the authorized gesture signatures in database 118.

When millimeter-wave radar system 100 (e.g., using processor 104) determines that the gesture signature matches an authorized gesture signature, millimeter-wave radar system 100 (e.g., using processor 104) authorizes access to car 101 (e.g., by unlocking the doors of car 101) during step 212. If the gesture signature does not match any authorized gesture signatures in database 118, millimeter-wave radar system 100 then detects an intrusion during step 214 and takes appropriate action (e.g., reporting intrusion to owner of record via a smartphone app, sounding an alarm, or other action). In some embodiments, a predetermined number of attempts (e.g., 3 attempts) are allowed during step 208 before detecting an intrusion during step 214.

In some embodiments, database 118 includes a single authorized gesture signatures associated with a particular authorized user. Such authorized user may be identified using a fingerprint signature during step 206. For example, in some embodiments, database 118 includes a first authorized gesture associated with a first authorized human, and a second authorized gesture associated with a second authorized human. When the first authorized human is detected during step 206, only the first authorized gesture results in a match during step 208. Other embodiments may include a plurality of authorized gesture signatures associated with the particular authorized user. In some embodiments, one or more authorized gesture signatures may be independent (i.e., not associated with a particular authorized user).

In some embodiments, instead of using database 118 to of authorized gesture signatures for authenticating the user, an authorized gesture signature is automatically, randomly or pseudo-randomly, generated and delivered to an authorized smartphone (e.g., after a fingerprint match is found during step 206). Such automatically generated gesture signature has an expiration time (e.g., 2 minutes). In other words, if, during step 208, millimeter-wave radar 102 does not capture the automatically generated gesture within the expiration time, an intrusion attempt may be detected (step 214).

In some embodiments, finger gesture 113 is performed, for example, in the air. In some embodiments, finger gesture 113 is performed while the finger is in contact with a surface, such as the surface of the handle of car 101. In some embodiments, the gesture is performed in a projected unlock area, such as an area projected (e.g., with light) in a window of car 101 (e.g., a pattern may be projected in the window of the car). In some embodiments, an additional millimeter-wave radar (not shown in FIG. 1) is used for detecting the gesture of the finger.

In some embodiments, millimeter-wave radar 102 determines the location of the finger performing the gesture, and performs a corresponding finger location tracking by periodically determining the range component of the finger using range FFT and determining the azimuth component of the azimuth component of the finger by determining the angle of arrival, e.g., using a mono-pulse algorithm. In some embodiments, the Doppler velocity of the finger is also determined and used as part of the gesture recognition signature. Other gesture tracking mechanisms may also be used. Some embodiments perform gesture recognition according to U.S. patent application Ser. No. 16/039,940, and U.S. patent application Ser. No. 16/040,019, which are incorporated herein by reference.

In some embodiments, millimeter-wave radar 102 advantageously performs both modes of authentication (steps 206 and 208) without additional sensors.

Some embodiments may implement, instead of or in addition to the gesture recognition of step 208, a facial recognition (step 210) as a second mode of authentication. For example, during step 210, an additional millimeter-wave radar (not shown in FIG. 1) may be disposed in car 101 at a height suitable to reach a face of human 101 (e.g., such as in a roof of car 101, or on a top portion of a door of car 101).

The additional millimeter-wave radar transmits a plurality of radiation pulses 106 towards the face of human 110 to capture facial characteristics 114, e.g., using time-of-flight (ToF) facial recognition. The transmitted radiation pulses are reflected by the face of human no. The reflected radiation pulses (not shown in FIG. 1) are detected by the additional millimeter-wave radar and processed by a corresponding processor (which in some embodiments may be processor 104) to generate a facial characteristic signature (i.e., a digital representation) corresponding to facial characteristic 114. Millimeter-wave radar system 100 (e.g., using processor 104) then compares the facial characteristic signature to an authorized facial characteristic signature, such as an authorized facial characteristic signature stored in database 120, to determine whether the facial characteristic signature matches any of the authorized facial characteristic signatures.

When millimeter-wave radar system 100 (e.g., using processor 104) determines that the facial characteristic signature matches an authorized facial characteristic signature, millimeter-wave radar system 100 (e.g., using processor 104) authorizes access to car 101 (e.g., by unlocking the doors of car 101) during step 212. If the facial characteristic signature does not match any authorized facial characteristic signatures in database 120, millimeter-wave radar system 100 then detects an intrusion during step 214 and takes appropriate action (e.g., reporting intrusion to owner of record via a smartphone app, sounding an alarm, or other action). In some embodiments, a predetermined number of attempts (e.g., 3 attempts) are allowed during step 210 before detecting an intrusion during step 214.

In some embodiments, to avoid excessive power consumption, the additional millimeter-wave radar used during step 210 is only activated when prior authentications steps (e.g., 206 and/or 208) matches an authorized user.

In some embodiments, database 120 includes a single authorized facial characteristic signatures associated with a particular authorized user. Such authorized user may be identified using a fingerprint signature during step 206. For example, in some embodiments, database 120 includes a first authorized facial characteristic associated with a first authorized human, and a second authorized facial characteristic associated with a second authorized human. When the first authorized human is detected during step 206, only the first authorized facial characteristic results in a match during step 210. Other embodiments may include a plurality of authorized facial characteristic signatures associated with the particular authorized user. In some embodiments, one or more authorized facial characteristic signatures may be independent (i.e., not associated with a particular authorized user).

In some embodiments, millimeter-wave radar 102 is inside the handle of car 101. In other embodiments, millimeter-wave radar 102 is behind a different surface of the car. For example, in some embodiments, car 101 does not have any handles. In such embodiments, millimeter-wave radar 102 is behind a predetermined surface of car 101 (e.g., located in a roof, door or other side surface of car 101). When human no touches the predetermined surface, millimeter-wave radar 102 proceeds with the capturing of fingerprint 112 (step 206) and other authentication steps (e.g., steps 208 and/or 210), if applicable. Upon authentication of human 110 (step 212), car 101 proceeds with the opening of a door of the car through an automated mechanism.

Millimeter-wave radar 102 operates as a frequency-modulated continuous wave (FMCW) radar or pulsed Doppler radar that includes a millimeter-wave radar sensor circuit, transmitting antennas, and receiving antennas. Millimeter-wave radar 102 transmits and receives signals in the 20 GHz to 122 GHz range. Alternatively, frequencies outside of this range, such as frequencies between 1 GHz and 20 GHz, or frequencies between 122 GHz, and 300 GHz, may also be used.

In some embodiments, the echo signals received by the receiving antennas of millimeter-wave radar 102 are filtered and amplified using band-pass filter (BPFs), low-pass filter (LPFs), mixers, low-noise amplifier (LNAs), and intermediate frequency (IF) amplifiers in ways known in the art by, e.g., millimeter-wave radar 102. The echo signals are then digitized using one or more analog-to-digital converters (ADCs) for further processing, e.g., by processor 104. Other implementations are also possible.

In some embodiments, millimeter-wave radar 102 communicates with processor 104 using communication interface 110. Communication interface no may be, for example, of the serial peripheral interface (SPI), inter-integrated circuit ($I^2C$), or universal asynchronous receiver-transmitter (UART) type. Other communication interfaces may be used.

Processor 104 may be implemented as a general purpose processor, controller or digital signal processor (DSP) that includes, for example, combinatorial circuits coupled to a memory. In some embodiments, the DSP may be implemented with an ARM architecture, for example. In some embodiments, processor 104 may be implemented as a custom application specific integrated circuit (ASIC). In some embodiments, processor 104 includes a plurality of processors, each having one or more processing cores. In other embodiments, processor 104 includes a single processor having one or more processing cores. Other implementations are also possible. For example, some embodiments may implement a decoder using software running in a general purpose micro-controller or processor having, for example, a CPU coupled to a memory and implemented with an ARM or x86 architecture. Some embodiments may be implemented as a combination of hardware accelerator and software running on a DSP or general purpose microcontroller.

In some embodiments, processor 104 may be implemented inside millimeter-wave radar 102.

In some embodiments, databases 116, 118, and/or 120 are implemented inside processor 104, such as in a local memory associated with processor 104. In other embodiments, databases 116, 118, and/or 120 are implemented independently of processor 104, such as in the cloud, for example. In some embodiments, databases 116, 118, and 120 are implemented inside the same database.

Other methods of authentication may be used instead of, or in addition to gesture recognition (step 208) and facial recognition (step 210). For example, in some embodiments, after a match is identified during step 206, a user may tap on a surface of car 101 with a tapping pattern (e.g., captured by an accelerometer) that matches a predetermined tapping pattern signature to gain access to car 101. Other authentication mechanisms are also possible.

Advantages of some embodiments include securely authenticating a user without using optical, thermal, ultrasound or capacitive sensors. For example, some embodiments exhibit smaller form factor, lower power consumption, and higher robustness when used with strong sun light, wet fingers, old or very your humans, when compared to conventional biometric acquisition systems, such as based on optical technology. Some embodiments are advantageously less susceptible to image distortion that may be caused by residual prints from a previous user when compared to conventional optical systems. Additionally, some embodiments are advantageously less susceptible to being fooled by, e.g., captured 2-D images, or prosthetics, when compared to conventional optical systems. Some embodiments are not susceptible to wear of the coating and CCD arrays, thereby advantageously mainlining high accuracy as the system ages. Additional advantages include lower susceptibility to electromagnetic discharge (ESD).

Figure 3B:
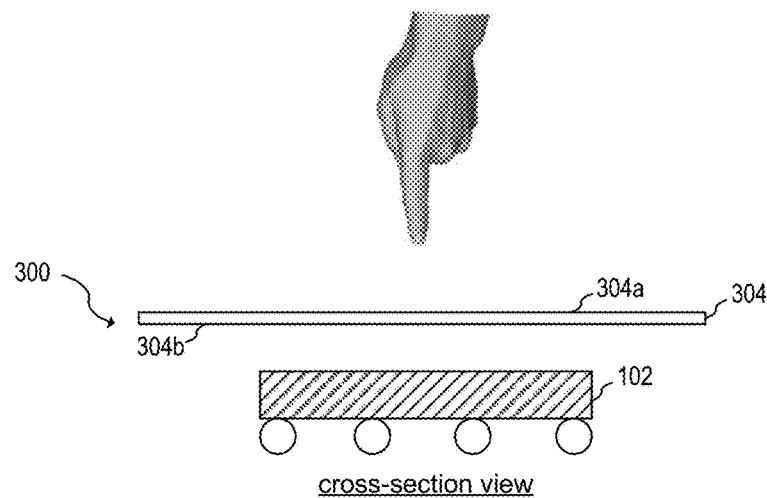
FIG. 3B shows a cross-sectional view of the handle of FIG. 3A, according to an embodiment of the present invention.

FIG. 3A shows handle 300 of car 101, according to an embodiment of the present invention. As shown in FIG. 2, handle 300 includes millimeter-wave radar 102. In some embodiments, millimeter-wave radar 102 is disposed inside handle 300. For example, FIG. 3B shows a cross-sectional view of handle 300, according to an embodiment of the present invention. Handle 300 includes outer material 304. Outer material has outer surface 304a facing away from car 101 and inner surface 304 facing towards car 101. As shown in FIG. 3B, for fingerprint capture during step 206, the finger is in contact with outer surface 304a.

In some embodiments, outer material 304 includes plastic. Plastic advantageously allows for millimeter-wave signals (e.g., generated by millimeter-wave radar 102) to travel through it. It is thus advantageously possible to hide millimeter-wave radar 102 inside handle 300. Other materials that allow millimeter-waves to travel through may also be used, such as, for example, Teflon (PTFE), acrylonitrile butadiene styrene (ABS), nylon, polycarbonates (PC), ceramic, glass, or any substrate material(s) that allow millimeter-waves to travel through.

Figure 3C:
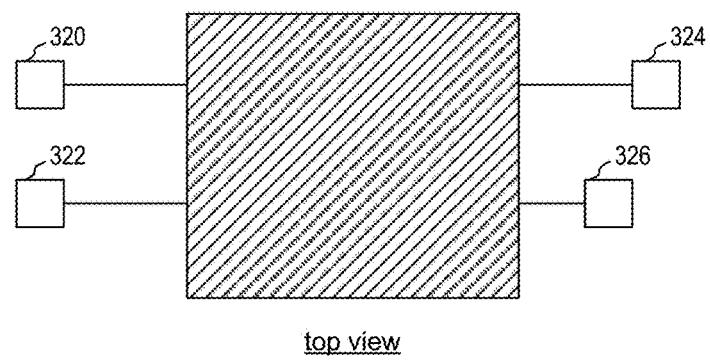
FIG. 3C shows a top view of a layout of the millimeter-wave radar of FIG. 1, according to an embodiment of the present invention.

FIG. 3C shows a top view of a layout of millimeter-wave radar 102, according to an embodiment of the present invention. Outer material 304 is not shown for clarity purposes. As shown in FIG. 3C, millimeter-wave radar 102 includes transmitting antennas 320 and 322 and receiving antennas 324 and 326. Transmitting antennas 320 and 322 are aligned vertically, and receiving antennas 324 and 326 are misaligned vertically, as shown in FIG. 3C. As also shown in FIG. 3C, transmitting antenna 320 and receiving antenna 324 are aligned horizontally, and transmitting antennas 322 and receiving antennas 326 are aligned horizontally. Other antenna arrangements are also possible.

Some embodiments may include more than two transmitting antennas and/or more than two receiving antennas. Using more than two transmitting antennas and/or more than two receiving antennas advantageously allows for increase accuracy when performing space detection.

In some embodiments, fingerprint recognition may be performed with less than two transmitting/receiving antennas, such as with a single transmitting antenna (e.g., 320) and a single receiving antenna (e.g., 324). Using a single transmitting antenna and a single receiving antenna advantageously allows for fingerprint surface identification, for example.

Some embodiments include more than two transmitting antennas and/or more than two receiving antennas. Using more transmitting antennas and/or more receiving antennas may improve fingerprint and gesture recognition. For example, correlation of information can be done with more receiver channels as the number of receiving antennas increases. As another example, if transmitter beamforming is applied in combination with receiver beamforming, the cross-range image formation may improve.

Figure 3D:
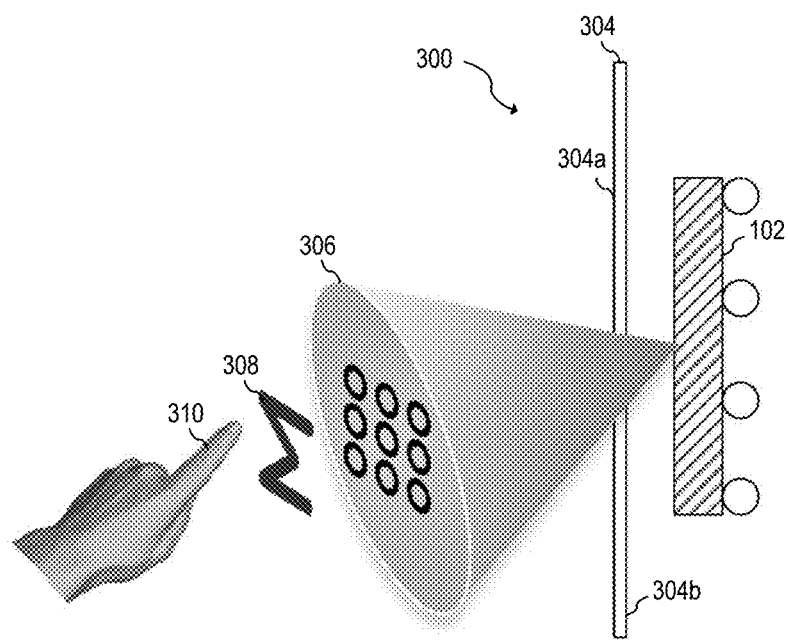
FIG. 3D shows a finger of a human performing a gesture using the millimeter-wave radar of FIG. 1, according to an embodiment of the present invention.

FIG. 3D shows a finger of a human performing gesture 308 using millimeter-wave radar 102, according to an embodiment of the present invention. As shown in FIG. 3D, during step 208, pattern 306 is projected, e.g., in the air. Finger 310 performs gestures 308 on top of pattern 306. In some embodiments, pattern 306 is invisible or not projected.

Figure 3E:
FIG. 3E shows a steering wheel of the car of FIG. 1, according to an embodiment of the present invention.

The embodiments of authentication systems and mechanisms discussed in FIGS. 1 and 2 may also be used to control access to other features of car 101. For example, in some embodiments, a millimeter-wave radar may be disposed at or near a steering wheel of car 101 to authorize a user to start and operate car 101 (such as start the engine of car 101 when a match is determined). For example, FIG. 3E shows steering wheel 330 of car 101, according to an embodiment of the present invention. Steering wheel 330 includes (e.g., inside) millimeter-wave radar 332. Millimeter-wave radar 332 operates in a similar manner as millimeter-wave radar 102. Gesture recognition and facial recognition may also be used in, e.g., the steering wheel as second mode of authentication. In some embodiments a single processor (e.g., 104) may be shared by millimeter-wave radar 102 and millimeter-wave radar 332.

Figure 4:
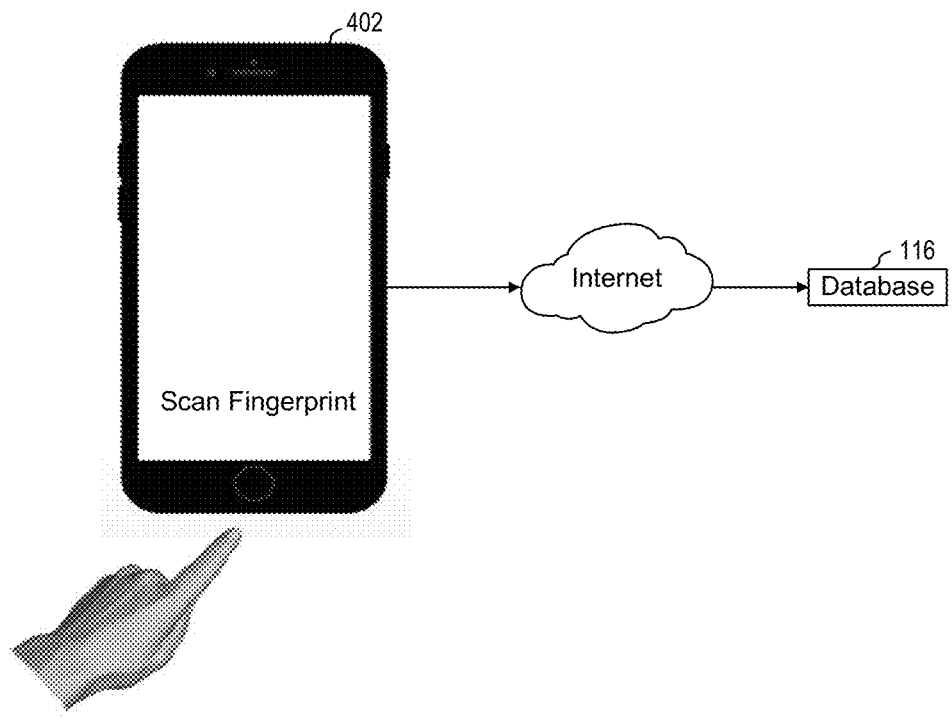
FIG. 4 shows a human including an authorized fingerprint signatures into the fingerprint database of FIG. 1, according to an embodiment of the present invention.

The embodiments of authentication systems and mechanisms discussed in FIGS. 1 and 2 may be controlled using the Internet, e.g., via a smartphone app or through a website. For example, FIG. 4 shows human no including (i.e., registering) an authorized fingerprint signature into database 116, according to an embodiment of the present invention. As shown human no scans a fingerprint with smartphone 402, e.g., using an app. Smartphone 402 then sends the fingerprint signature through the cloud into database 116. The same registration processes may be performed with other devices, such as a personal computer, laptop, tablet, etc. Some embodiments may also allow for registering a fingerprint signature using millimeter-wave radar 102. A user may also delete an authorized signature through a smartphone, personal computer, laptop, tablet, or through an interface of car 101.

Figure 5:
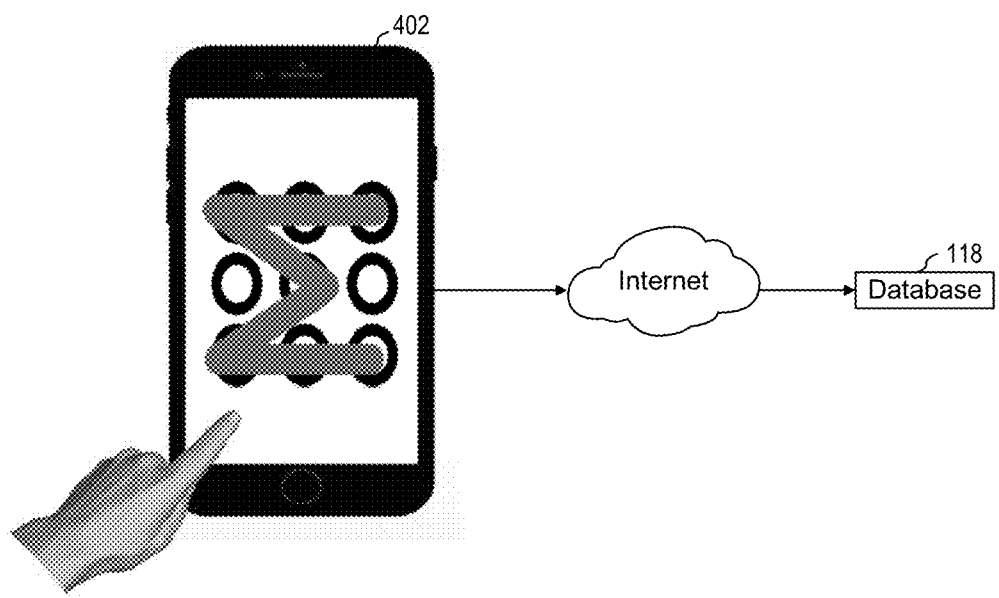
FIG. 5 shows human no including an authorized gesture signature into database 118, according to an embodiment of the present invention.

A user may also include (or delete) authorized gesture signatures into database 118 and/or authorized facial recognition signatures into database 120 using a smartphone, personal computer, laptop, tablet, and/or a millimeter-wave radar. For example, FIG. 5 shows human no including (i.e., registering) an authorized gesture signature into database 118, according to an embodiment of the present invention. As shown human no scans a gesture pattern in smartphone 402, e.g., using an app. Smartphone 402 then sends the gesture signature through the cloud into database 118. The same registration processes may be performed with other devices, such as a personal computer, laptop, tablet, etc. Some embodiments may also allow for registering a gesture signature using millimeter-wave radar 102.

Figure 6:
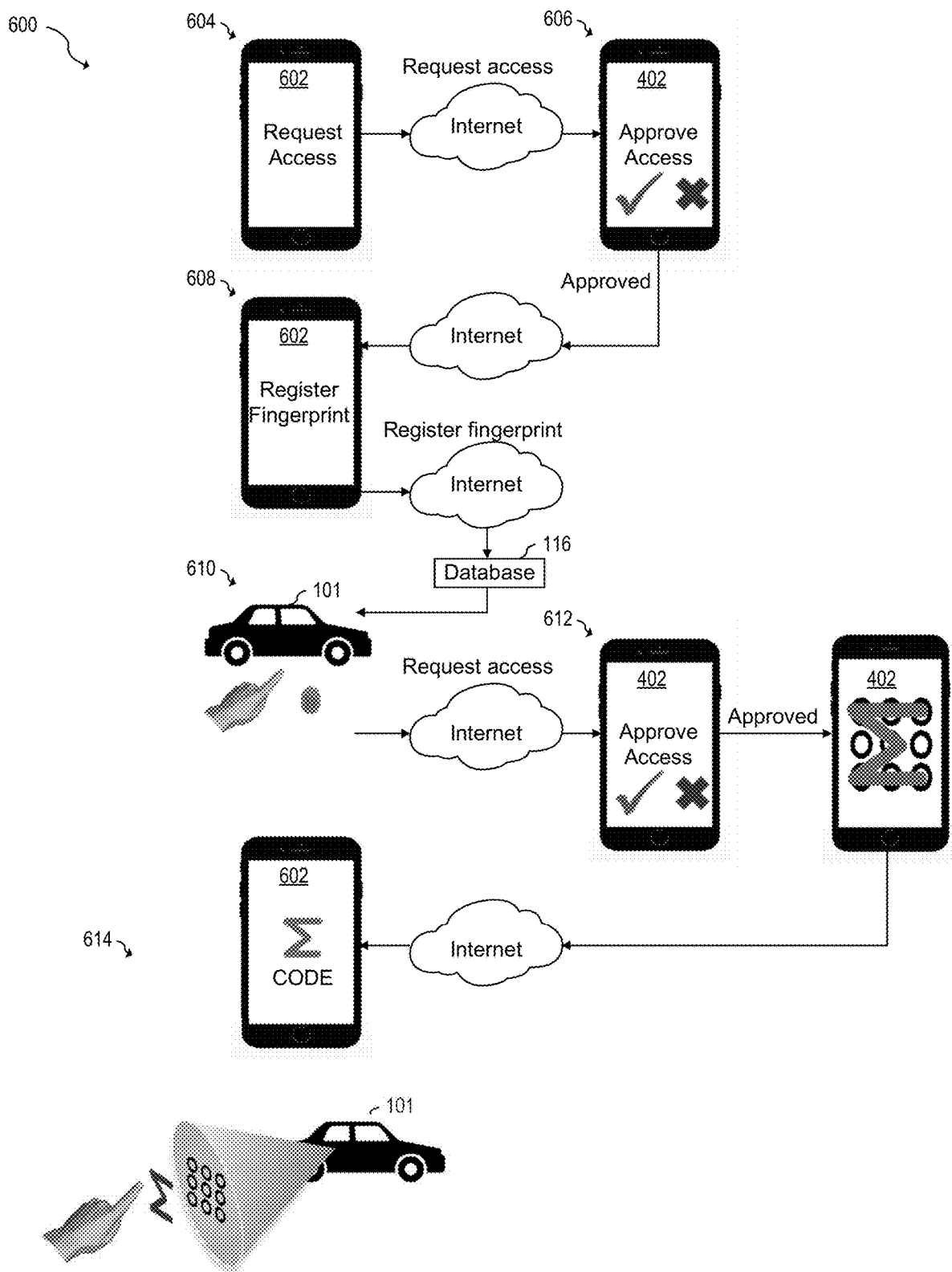
FIG. 6 shows a flow chart of an embodiment method of authorizing another user to the car of FIG. 1, according to an embodiment of the present invention.

In some embodiments, an authorized user of car 101 may authorize another user through the cloud. For example, FIG. 6 shows a flow chart of embodiment method 600 of authorizing another user to car 101, according to an embodiment of the present invention.

During step 604, a new user, (such as a family member or friend of, e.g., the owner of car 101, or a valet parking person) requests access to car 101 using smartphone 602. During step 606, the owner of car 101 (or, e.g., a designated administrator) receives the requests and can approve it or reject it using smartphone 402. If approved, the new user then registers a fingerprint into database 116 using smartphone 602 during step 608.

During step 610, the new user scans a fingerprint using millimeter-wave radar by, e.g., performing steps 202, 204, and 206. If a match is obtained, a request is sent to the smartphone 402 for approval.

During step 612, the owner of car 101 receives the requests and can approve it or reject it using smartphone 402. If approved, the owner of car 101 generates a gesture using smartphone 402 and sends it to smartphone 602.

During step 614, the new user receives the gesture on smartphone 602, and performs the gesture in the field-of-view of millimeter-wave radar 102 (e.g., performing step 208). If a match is found between the gesture performed by the new user and the gesture received in smartphone 602, access is granted to car 101.

Steps 602, 606 and 608 may be performed once per new user to register the new user. Subsequent requests by an already registered user may begin in step 610.

Figure 7:
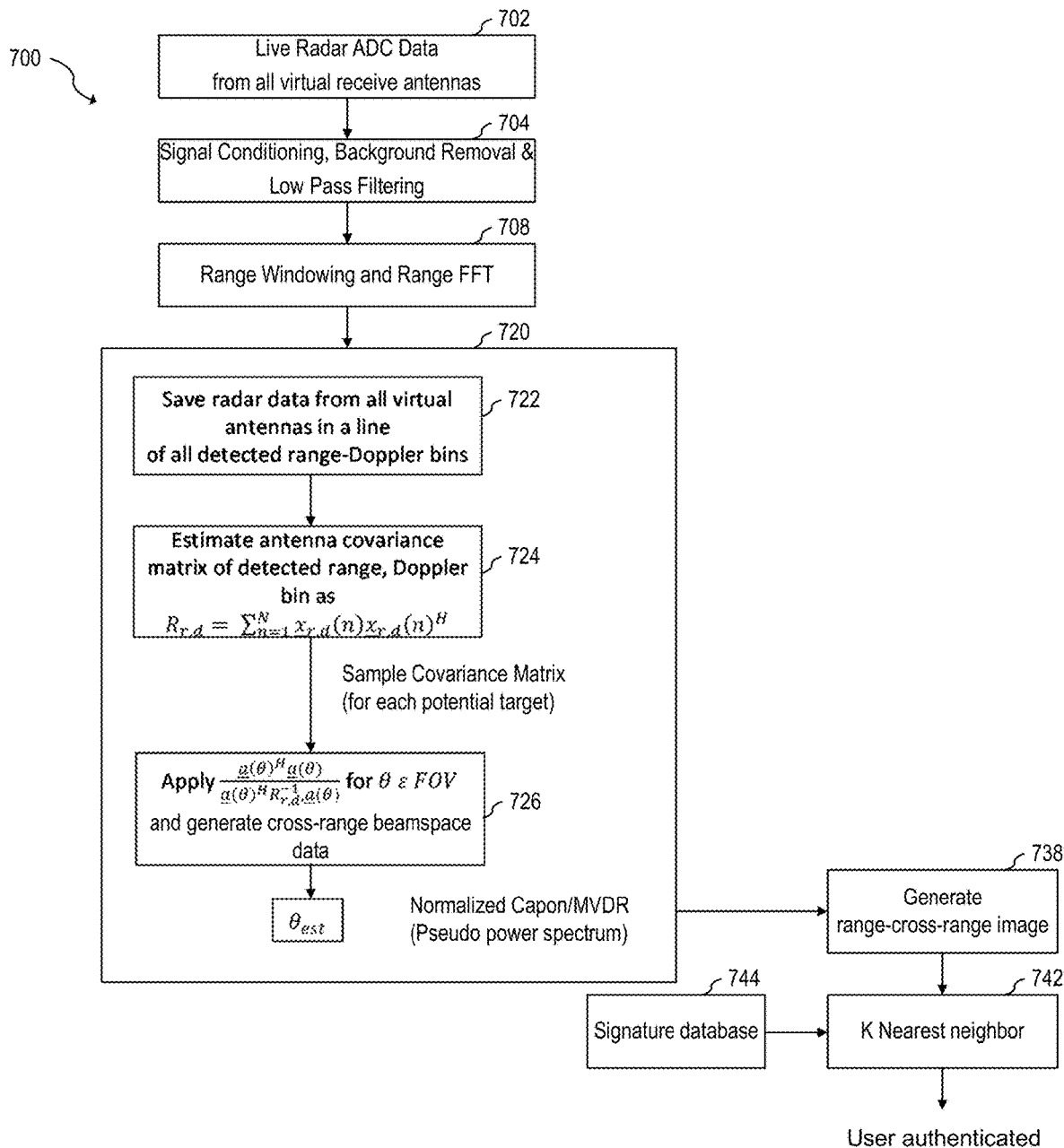
FIG. 7 illustrates a block diagram of an embodiment method for performing fingerprint recognition using the millimeter-wave radar of FIG. 1, according to an embodiment of the present invention.

FIG. 7 illustrates a block diagram of embodiment method 700 for performing fingerprint recognition (step 206) using millimeter-wave radar 102, according to an embodiment of the present invention. Radar processing occurs as follows. In steps 702, 704, and 708, radar data is collected from millimeter-wave radar 102 and objects (e.g., the finger) are detected in the field of view of millimeter-wave radar 102. In step 720, and 738, a range-cross-range 2D image having azimuth and depth information (e.g., of the fingerprint) is generated, in part, using a Capon/MVDR analysis. During steps 740, 742 and 744, the 2D image is transformed according to a predictive model and is compared with 2D reference images of a signature database (e.g., the signatures in database 116) to determine whether the captured fingerprint matches an authorized fingerprint signature. It is understood that method 700 may also be performed for gesture recognition (step 208) and facial recognition (step 210).

In step 702, live radar data is collected from millimeter wave radar 102. In some embodiments, this radar data is collected from digitized baseband radar data and includes separate baseband radar data from multiple antennas.

In step 704, signal conditioning, low pass filtering and background removal is performed. During step 704, radar data received during step 702 is filtered, DC components are removed, and IF data is filtered to, e.g., remove the Tx-Rx self-interference and optionally pre-filtering the interference colored noise. In some embodiments, filtering includes removing data outliers that have significantly different values from other neighboring range-gate measurements. Thus, this filtering also serves to remove background noise from the radar data. In a specific example, a Hampel filter is applied with a sliding window at each range-gate to remove such outliers. Alternatively, other filtering for range preprocessing known in the art may be used.

In step 708, a series of FFTs are performed on conditioned radar data produced by step 704. In some embodiments, a windowed FFT having a length of the chirp (e.g., 256 samples) is calculated along each waveform for each of a predetermined number of chirps in a frame of data. Alternatively, other frame lengths may be used. The FFTs of each waveform or chirp may be referred to as a "range FFT." In alternative embodiments, other transform types could be used besides an FFT, such as a Discrete Fourier Transform (DFT) or a z-transform.

In various embodiments, a beam is formed at the transmitter by post processing a plurality of baseband signals based on a plurality of signals received by different receivers or a combination thereof. Implementing beamforming by post processing received baseband signals may allow for the implementation of a low complexity transmitter.

In one example, a millimeter-wave sensor system is used with $N_t=2$ transmit (TX) elements and $N_r=2$ receive (RX) elements arranged in a array (e.g., as shown in FIG. 3C). Accordingly, there are $N_t \times N_r=4$ distinct propagation channels from the TX array to the RX array in an array configuration for azimuth angle profiling. If the transmitting source (TX channel) of the received signals can be identified at the RX array, a virtual phased array of $N_t \times N_r$ elements can be synthesized with $N_t+N_r$ antenna elements. In various embodiments, a time division multiplexed MIMO array provides a low cost solution to a fully populated antenna aperture capable of near field imaging.

In step 722 data is saved from all virtual antennas in a line of detected range-Doppler bins. In step 724, the antenna covariance matrix of the detected range-Doppler bins is estimated as follows:

$$R_{r,d} = \Sigma_{n=1}^{N} \underline{x}_{r,d}(n)\underline{x}_{r,d}(n)^H,$$

where $R_{r,d}$ is antenna covariance matrix, $\underline{x}_{r,d}(n)$ represents the data over a particular (range, Doppler)=(r,d) and n represents the specific (r,d) data across multiple frames (n being the indices, and N is the number of frames considered). In step 726, a MVDR algorithm is applied to the range and Doppler data as follows using the above derived covariance matrix:

$$P(\theta) = \frac{\underline{a}(\theta)^H \underline{a}(\theta)}{\underline{a}(\theta)^H R_{r,d}^{-1} \underline{a}(\theta)},$$

where $P(\theta)$ represents azimuth spatial spectrum, and $\underline{a}(\theta)$ is the virtual antenna steering vector along the azimuth angle for test angle $\theta$ within the field-of-view. In an embodiment, the value $\theta$ is found that provides a peak value for $P(\theta)$. This determined value for $\theta$ is the estimated azimuth angle $\theta_{est}$ of the detected target (e.g., the finger).

In step 738, a range-cross-range 2D image having azimuth and range information is generated. In some embodiments, the range-cross-range 2D image includes information for all range bins. In other embodiments, the range-cross-range 2D image only includes information in the range bins in which the finger has been identified. Range bins without an identified object are populated with, e.g., zeros.

In step 442 the range-cross-range 2D image is compared with one or more reference signatures (e.g., fingerprint signatures) of a signature database (e.g., database 116) using, e.g., a nearest neighbor algorithm, to determine whether there is a match between the captured fingerprint and a reference fingerprint. If a match is fount, the user is authenticated (step 212).

In some embodiments, millimeter-wave radar system 100 may be trained to increase the accuracy and effectiveness of fingerprint recognition (step 206), gesture recognition (step 208) and/or facial recognition (step 210). As a non-limiting example, such training may occur when human no purchases car 101.

Figure 8:
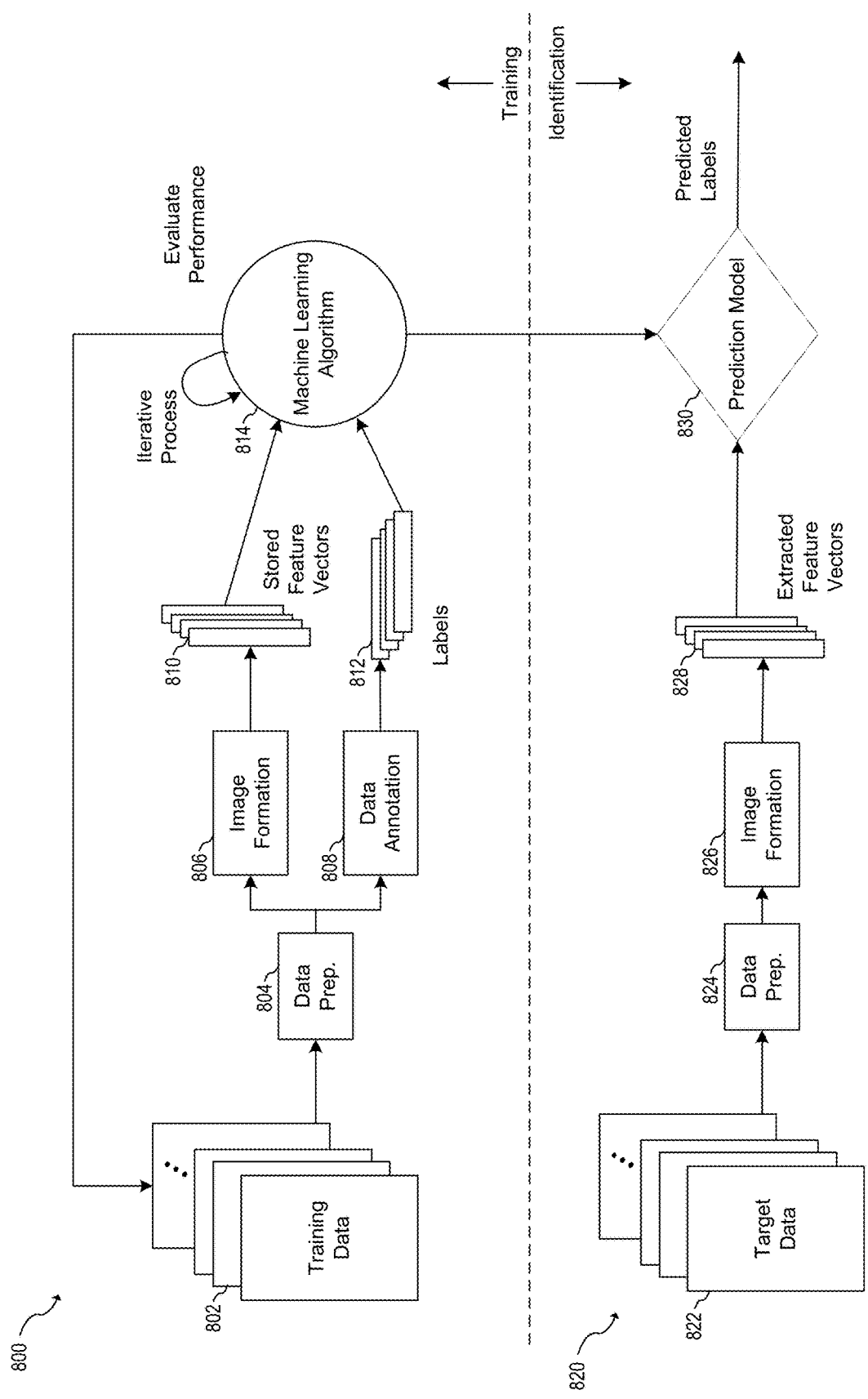
FIG. 8 illustrates a block diagram showing a machine learning pipeline for machine language based feature extraction and identification, according to an embodiment of the present invention.

FIG. 8 illustrates a block diagram showing a machine learning pipeline for machine language based feature extraction and identification that can be used to generate reference signatures (step 744) for an authorized signature database (e.g., databases 116, 118, and/or 120) to classify a user as authenticated (a match from steps 206, 208 and/or 210), according to an embodiment of the present invention. The top portion 800 of FIG. 8 is devoted to the processing storage of features for comparison to later measurements. The data and steps shown in this portion represent the actions performed when radar measurements are performed and processed for a classification category. The bottom portion 820 is devoted to the processing and comparison of new measurements for comparison to stored data. These data and steps represent the actions performed when the system is identifying user as an authenticated (authorized) or not authenticated user.

As shown in the top portion 800 of FIG. 8, training data 802 is transformed into stored feature vectors 810 and corresponding labels 812. Training data 802 represents the raw data (e.g., echo). Feature vectors 810 represent sets of generated vectors that are representative of the training data 802. Labels 812 represent user metadata associated with the corresponding training data 802 and feature vectors 810.

As shown, training data 802 is transformed into feature vectors 810 using embodiment image formation algorithms. Data preparation block 804 represents the initial formatting of raw sensor data, and data annotation block 808 represents the status identification from training data 802.

During operation, one or more radar images are taken of a controlled environment that includes, e.g., one or more attempts of fingerprint scanning (for fingerprint recognition), and/or one or more attempts of finger gesture scanning (for finger gesture recognition) using millimeter-wave radar 102. In some embodiments, one or more radar images are taken of a controlled environment that includes, e.g., one or more attempts of facial scanning (for facial recognition) using the additional millimeter-wave radar.

In some cases, multiple radar images are recorded to increase the accuracy of identification. Machine learning algorithm 814 evaluates the ability of a prediction model 830 to identify feature vectors and iteratively updates training data 802 to increase the classification accuracy of the algorithm. The training performance of the machine learning algorithm may be determined by calculating the cross-entropy performance. In some embodiments, the machine learning algorithm 814 iteratively adjusts image formation parameters for a classification accuracy of at least 90%. Alternatively, other classification accuracies could be used.

Machine learning algorithm 814 may be implemented using a variety of machine learning algorithms known in the art. For example, a random forest algorithm or neural network algorithm, such as a ResNet-18 or other neural network algorithm known in the art, may be used for classification and analysis of stored feature vectors 810. During the iterative optimization of stored feature vectors 810, a number of parameters of image formation 806 may be updated.

Once the system has been trained using reference training data 802, the reference signatures (e.g., stored in databases 116, 118, and/or 120) may be used for classification during normal operation. During normal operation, new target data 822 is received (e.g., during steps 206, 208, and/or 210). Data preparation block 824 prepares the new target data 822 for image formation, and image formation block 826 forms new extracted feature vectors 828. Prediction model 830 utilizes machine learning algorithm 814 to match new extracted feature vectors 828 to a stored feature vector 810 (e.g., stored in databases 116, 118, and/or 120). When a match is identified, a predicted label is provided that identifies the new feature vector. In some embodiments, data from the stored labels 812 is provided as a predicted label. Prediction model 830 may be a machine learning model with optimal parameters computed/evaluated through a machine learning algorithm.

Example embodiments of the present invention are summarized here. Other embodiments can also be understood from the entirety of the specification and the claims filed herein.

Example 1. A method for authenticating a user of a car, the method including: transmitting a plurality of radiation pulses through a predetermined portion of a surface of the car towards a portion of a hand of the user using a millimeter-wave radar; receiving a reflected signal from the portion of the hand using the millimeter-wave radar; generating a fingerprint signature based on the reflected signal; comparing the fingerprint signature to a database of authorized fingerprint signatures; and authorizing the user based on whether the fingerprint signature matches an authorized fingerprint signature of the database of authorized fingerprint signatures.

Example 2. The method of example 1, where the predetermined portion of the surface of the car includes a surface of a handle of the car.

Example 3. The method of one of examples 1 or 2, where the reflected signal includes the reflected signal from a portion of a finger while the finger touches the predetermined portion of the surface of the car.

Example 4. The method of one of examples 1 to 3, where the predetermined portion of the surface of the car includes a surface of a steering wheel of the car.

Example 5. The method of one of examples 1 to 4, where the predetermined portion of the surface of the car includes a portion of a scanning plaque.

Example 6. The method of one of examples 1 to 5, where the portion of the hand of the user includes a portion of a palm of the hand.

Example 7. The method of one of examples 1 to 6, further including detecting a proximity of the user to the car, where transmitting the plurality of radiation pulses includes transmitting the plurality of radiation pulses after detecting the proximity of the user.

Example 8. The method of one of examples 1 to 7, where detecting the proximity of the user to the car includes detecting the proximity of the user using the millimeter-wave radar.

Example 9. The method of one of examples 1 to 8, where each of the plurality of radiation pulses includes a linear chirp.

Example 10. The method of one of examples 1 to 9, further including adding an authorized fingerprint signature to the database of authorized fingerprint signatures by: scanning a fingerprint with a smartphone; and sending the scanned fingerprint to the database of authorized fingerprint signatures.

Example 11. The method of one of examples 1 to 10, further including, after determining that the fingerprint signature matches an authorized fingerprint signature of the database of authorized fingerprint signatures, detecting a gesture of a finger using the millimeter-wave radar; generating a gesture signature based on the detected gesture; and comparing the gesture signature to a predetermined authorized gesture signature, where authorizing the user is further based on whether the gesture signature matches the predetermined authorized gesture signature.

Example 12. The method of one of examples 1 to 11, where the predetermined authorized gesture signature is based on the fingerprint signature.

Example 13. The method of one of examples 1 to 12, further including receiving a pattern of the predetermined authorized gesture signature before detecting the gesture of the finger.

Example 14. The method of one of examples 1 to 13, further including, after determining that the fingerprint signature matches an authorized fingerprint signature of the database of authorized fingerprint signatures, requesting a finger gesture by projecting an unlock area.

Example 15. The method of one of examples 1 to 14, further including: requesting access to the car using a smartphone; receiving approval via the smartphone; scanning a fingerprint with the smartphone; and registering the fingerprint as an authorized fingerprint signature in the database of authorized fingerprint signatures.

Example 16. The method of one of examples 1 to 15, further including generating an authorized reference signature using a machine learning algorithm.

Example 17. The method of one of examples 1 to 16, further including unlocking a door of the car when the user is authorized.

Example 18. The method of one of examples 1 to 17, where the fingerprint signature is indicative of a predetermined way of placing the hand in the predetermined portion of the surface of the car.

Example 19. A millimeter-wave radar including: two transmitting antennas configured to transmit a plurality of radiation pulses through a predetermined portion of a surface of a car; two receiving antennas configured to receive a reflected signal corresponding to the transmitted plurality of radiation pulses; and a processor configured to: generate a fingerprint signature based on the reflected signal, compare the generated fingerprint signature to a database of authorized fingerprint signatures, and authorize access to the car based on whether the fingerprint signature matches an authorized fingerprint signature of the database of authorized fingerprint signatures.

Example 20. The millimeter-wave radar of example 19, where the two receiving antennas are misaligned along a first axis, and where the two transmitting antennas are aligned along the first axis.

Example 21. A millimeter-wave radar system including: a first millimeter-wave radar including: a first transmitting antenna configured to generate a plurality of radiation pulses through a portion of a handle of a car, a first receiving antenna configured to receive a first reflected signal corresponding to the plurality of radiation pulses transmitted by the first transmitted antenna; a first processor configured to: generate a fingerprint signature based on the first reflected signal, compare the generated fingerprint signature to a database of authorized fingerprint signatures, and authorize access to the car based on whether the fingerprint signature matches an authorized fingerprint signature of the database of authorized fingerprint signatures; and a second millimeter-wave radar including: two transmitting antennas configured to generate a plurality of radiation pulses through a predetermined portion of a steering wheel of the car, two receiving antennas configured to receive a second reflected signal corresponding to the plurality of radiation pulses transmitted by the two transmitting antennas; and a second processor configured to: generate a gesture signature based on the second reflected signal, compare the generated gesture signature to a predetermined authorized gesture signature, and start an engine of the car based on whether the gesture signature matches the predetermined authorized gesture signature.

Example 22. The millimeter-wave radar system of example 21, where the first processor and the second processor are the same processor.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for authenticating a user of a car, the method comprising:
   transmitting a plurality of radar signals through a predetermined portion of a surface of the car towards a portion of a hand of the user using a millimeter-wave radar;
   receiving reflected radar signals from the portion of the hand using the millimeter-wave radar;
   generating a fingerprint signature based on the reflected radar signals;
   comparing the fingerprint signature to a database of authorized fingerprint signatures; and
   authorizing the user based on whether the fingerprint signature matches an authorized fingerprint signature of the database.

2. The method of claim 1, wherein the predetermined portion of the surface of the car comprises a surface of a handle of the car.

3. The method of claim 1, wherein the reflected radar signals comprise radar signals reflected from a portion of a finger of the hand while the finger touches the predetermined portion of the surface of the car.

4. The method of claim 1, wherein the predetermined portion of the surface of the car comprises a surface of a steering wheel of the car.

5. The method of claim 1, wherein the predetermined portion of the surface of the car comprises a portion of a scanning plaque.

6. The method of claim 1, wherein the portion of the hand of the user comprises a portion of a palm of the hand.

7. The method of claim 1, further comprising detecting a proximity of the user to the car, wherein transmitting the plurality of radar signals comprises transmitting the plurality of radar signals after detecting the proximity of the user.

8. The method of claim 7, wherein detecting the proximity of the user to the car comprises detecting the proximity of the user using the millimeter-wave radar.

9. The method of claim 1, further comprising:
   scanning a fingerprint with a smartphone;
   sending the scanned fingerprint to the database; and
   adding the authorized fingerprint signature to the database based on the scanned fingerprint.

10. The method of claim 1, further comprising, after determining that the fingerprint signature matches the authorized fingerprint signature of the database, requesting a finger gesture by projecting an unlock area.

11. The method of claim 1, further comprising:
    requesting access to the car using a smartphone;
    receiving approval via the smartphone;
    scanning a fingerprint with the smartphone; and
    registering the scanned fingerprint as the authorized fingerprint signature in the database before generating the fingerprint signature based on the reflected radar signals.

12. The method of claim 1, further comprising unlocking a door of the car when the user is authorized.

13. The method of claim 1, wherein the fingerprint signature is indicative of a predetermined way of placing the hand in the predetermined portion of the surface of the car.

14. The method of claim 1, wherein generating the fingerprint signature comprises generating a radar image based on the reflected radar signals, and wherein comparing the fingerprint signature to the database comprises comparing the radar image to one or more reference signatures of the database.

15. The method of claim 14, wherein comparing the radar image to the one or more reference signatures comprises using a nearest neighbor algorithm.

16. The method of claim 14, wherein the radar image is a range cross-range image.

17. A millimeter-wave radar comprising:
two transmitting antennas configured to transmit a plurality of radar signals through a predetermined portion of a surface of a car;
two receiving antennas configured to receive reflected radar signals; and
a processor configured to:
generate a fingerprint signature based on the reflected radar signals,
compare the generated fingerprint signature to a database of authorized fingerprint signatures, and
authenticate a user based on whether the fingerprint signature matches an authorized fingerprint signature of the database.

18. The millimeter-wave radar of claim 17, wherein the two receiving antennas are misaligned along a first axis, and wherein the two transmitting antennas are aligned along the first axis.

19. The millimeter-wave radar of claim 17, wherein generating the fingerprint signature comprises generating a radar image based on the reflected radar signals, and wherein comparing the generated fingerprint signature to the database of authorized fingerprint signatures comprises comparing the radar image to one or more reference signatures of the database.

20. A car comprising:
a surface;
a millimeter-wave radar configured to transmit radar signals through a predetermined portion of the surface of the car, and receive reflected radar signals; and
a processor configured to:
generate a fingerprint signature based on the reflected radar signals,
compare the generated fingerprint signature to a database of authorized fingerprint signatures, and
authenticate a user based on whether the fingerprint signature matches an authorized fingerprint signature of the database.

21. The car of claim 20, further comprising a handle that comprises the predetermined portion of the surface of the car, wherein the processor is further configured to authorize access to the car after the user is authenticated.

22. The car of claim 20, further comprising a steering wheel that comprises the predetermined portion of the surface of the car.

23. A millimeter-wave radar comprising:
two transmitting antennas configured to transmit radar signals through a predetermined portion of a surface of a car;
two receiving antennas configured to receive reflected radar signals; and
a processor configured to:
detect a gesture of a finger based on the reflected radar signals,
generate a gesture signature based on the detected gesture,
compare the gesture signature to a predetermined authorized gesture signature, and
authenticate a user based on whether the gesture signature matches the predetermined authorized gesture signature.

24. The millimeter-wave radar of claim 23, wherein the processor is further configured to:
generate a fingerprint signature based on the reflected radar signals, and
compare the generated fingerprint signature to a database of authorized fingerprint signatures, wherein authenticating the user is further based on whether the fingerprint signature matches an authorized fingerprint signature of the database.

* * * * *